O. O. ADKINS.
THREADING APPARATUS FOR PIPES.
APPLICATION FILED MAR. 3, 1920.
1,363,213.
Patented Dec. 28, 1920.
3 SHEETS—SHEET 1.
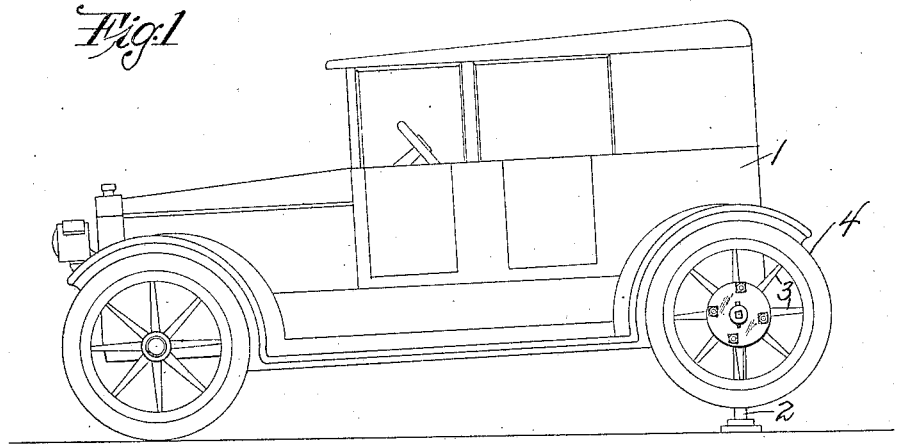
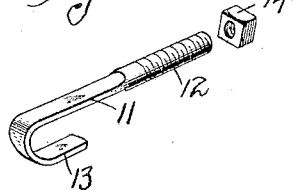
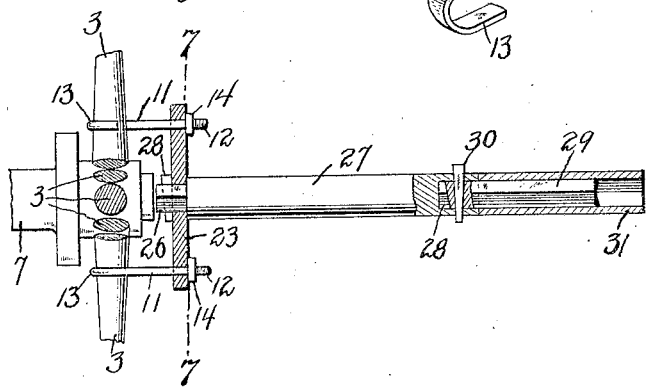
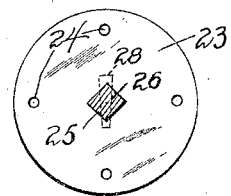
Inventor
Otto O. Adkins
By Franklin H. Hough
Attorney O. O. ADKINS.
THREADING APPARATUS FOR PIPES.
APPLICATION FILED MAR. 3, 1920.
1,363,213.
Patented Dec. 28, 1920.
3 SHEETS—SHEET 2.
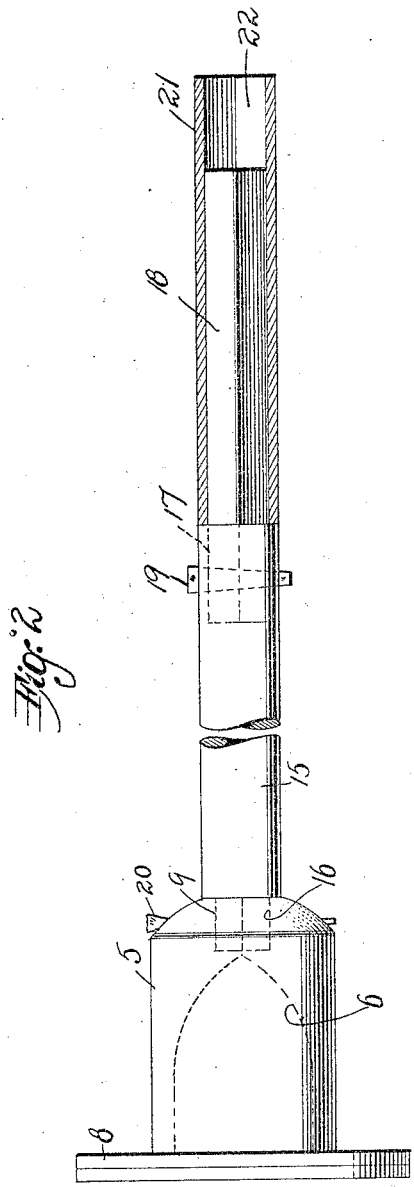
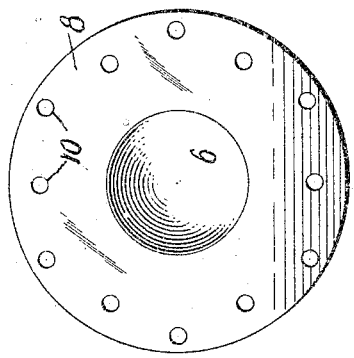
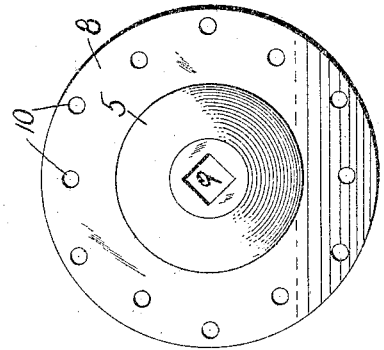
Inventor
Otto O. Adkins
By Franklin H. Hough
Attorney

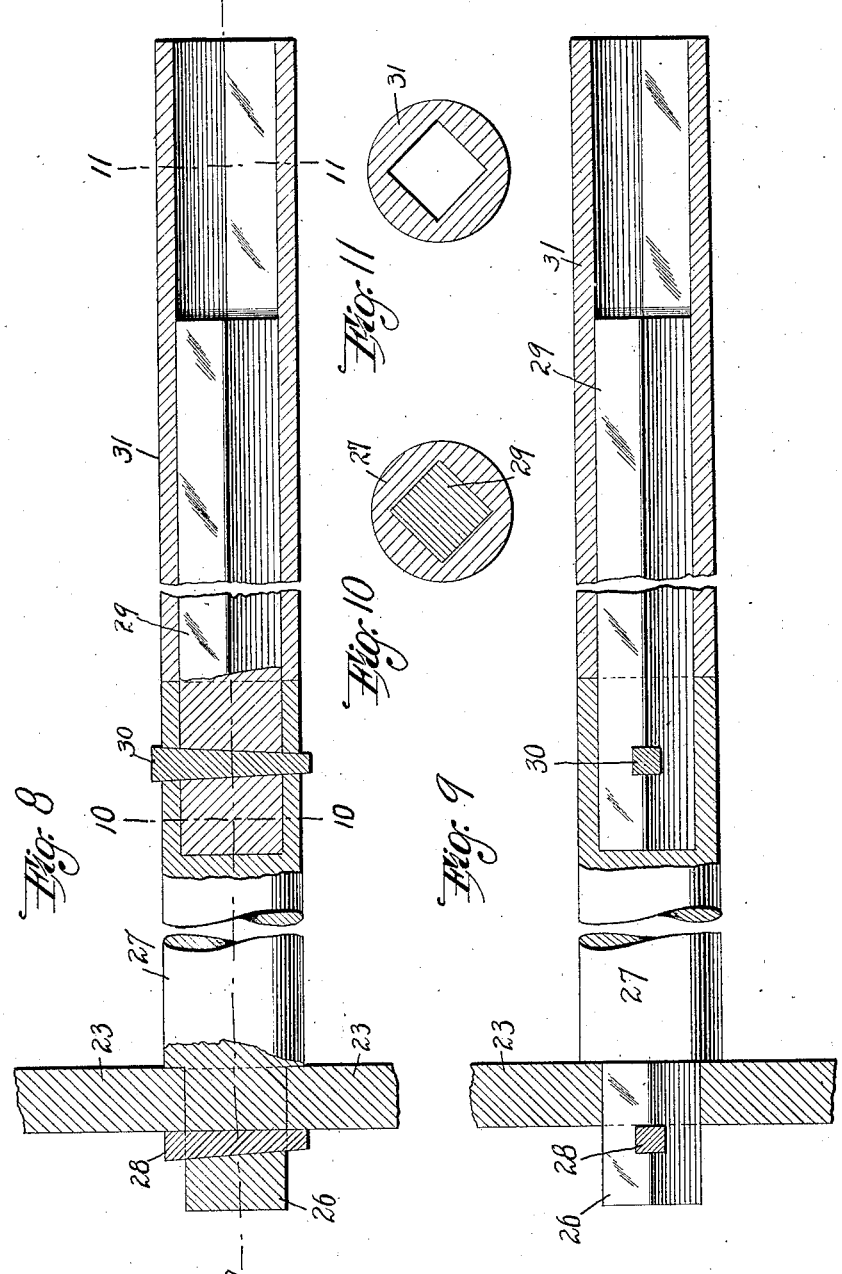

UNITED STATES PATENT OFFICE.

OTTO O. ADKINS, OF WICHITA FALLS, TEXAS.

THREADING APPARATUS FOR PIPES.

1,363,213.   Specification of Letters Patent.   Patented Dec. 28, 1920.

Application filed March 3, 1920. Serial No. 362,956.

*To all whom it may concern:*

Be it known that I, OTTO O. ADKINS, a citizen of the United States, residing at Wichita Falls, in the county of Wichita and State of Texas, have invented certain new and useful Improvements in Threading Apparatus for Pipes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a very simple form of attachment to a vehicle wheel, such as an automobile wheel, and which may be readily connected up with a pipe threading device so as to drive the same from the automobile motor through the wheel to which my device is attached.

In the accompanying drawings, forming a part of my specification:

Figure 1 is a view in side elevation of an automobile jacked up at the rear end, showing my attachment in operative position on one of the rear driving wheels.

Fig. 2 is a view in side elevation, partly in section, of the attachment.

Fig. 3 is a view in end elevation of the hub protector member.

Fig. 4 is a view looking at the opposite end of said hub protector member.

Fig. 5 is a detached detail view in perspective of one of the bolts for securing the hub protector member to the automobile wheel.

Fig. 6 is a fragmentary detail view in side elevation, partly in section, of a slightly modified form of attachment.

Fig. 7 is a sectional view on the line 7—7 of Fig. 6, looking in the direction of the arrows.

Fig. 8 is a fragmentary view in side elevation, partly in section, of the attachment shown in Fig. 6.

Fig. 9 is a sectional view on the line 9—9 of Fig. 8, and

Figs. 10 and 11 are cross sectional views on the lines 10—10 and 11—11, respectively, of Fig. 8.

Referring now in detail to the drawings:

1 designates, in general, an automobile, and 2 a conventional form of jack which may be used to elevate the rear driving wheels when it is desired to apply my attachment to one of said wheels.

Adapted to be secured to the spokes 3 of one of the driving wheels 4 of the automobile is, what may be termed, a hub protector member, comprising a body 5 which is annular in cross section and of sufficient length for the purpose intended. Said hub protector member is cored internally to provide the chamber 6, in which is disposed the hub and hub cap of the axle 7 of the automobile wheel 4, when the hub protector member is in an operative position on the wheel. Said member 5 is also provided with a lateral marginal flange 8 adapted to bear against the spokes 3 of the wheel when the member 5 is positioned on the wheel. At its opposite end the member 5 is cored to provide a recess 9 which is square in cross section.

As shown in Figs. 3 and 4, the flange 8 is provided with a substantially annular series of apertures 10, through which securing bolts 11 may pass, said bolts having a threaded portion 12 and a hook 13 at opposite ends.

In assembling the hub protector member 5, it is disposed in concentric relation with the axle 7, and the hooks 13 of the bolts 11 are engaged with the spokes 3 of the wheel, and the threaded portions 12 of said bolts are passed through the openings 10 in the flange 8, and nuts 14 are screwed on the threaded ends of said bolts, so as to firmly clamp the hub protector 5 against the spokes 3.

Adapted to be engaged with the hub protector 5, is a shaft 15 provided at one end with a cross-sectionally square projection, or key, 16 adapted to be disposed in the recess 9 of the member 5. At its opposite end said shaft 15 is cored to provide a recess 17 which is square in cross section. Preferably, a key 19 is provided, as shown in Fig. 2, to secure the rod 18 to the shaft 15. Also a second key 20 is preferably provided to secure the shaft 15 to the hub protector member 5.

Slidably engaged with the rod 18 is a tubular member 21 of a length such, that when it is slipped on the rod 18, with one end thereof bearing against the end of the shaft 15, said tubular member will project beyond the outer end of the rod 18, as shown in Fig. 2, this projecting end forming a socket 22, in which the pipe-threading mechanism (not shown) may be engaged.

In operation, it will be understood that when the attachment is in operative position on the automobile wheel 4, and the automobile jacked up at its rear, as shown in Fig. 1, so that the rear driving wheels 4 are elevated above the ground, and the automobile motor being started, said rear driving wheels will be rotated, thus rotating the hub protector member 5, and consequently the shaft 15, the rod 18 and the tubular member 21, and thereby in turn revolving the pipe-threading mechanism which is engaged with the recess 22 in the end of the tubular member 21. Obviously, however, instead of revolving a pipe-threading mechanism, any device, which is adapted to be engaged within the open end 22 of the tubular member 21, may be revolved.

In Figs. 6, 7, 8, 9, 10 and 11, I have shown a slightly modified form of attachment. In this form of device, instead of using the hub protector member 5 of the device previously described, I utilize a disk 23 which is provided with an annular series of openings 24 equidistantly spaced near its periphery.

In connection with said disk the hook members 11, of the previously described device, are used, said hook members 11 being passed through the openings 24 and the hook portions 13 engaged with the spokes 3 of the automobile wheel, as shown in Fig. 6. Nuts 14 are screwed on the threaded ends 12 of said hook members, and secure the disk 23 to said spokes. In connection with this disk any suitable form of spacing members may be used to hold the disk away from the spokes 3, so as to protect the hub and hub cap. The disk 23 is provided, centrally, with a square opening 25, through which the projection 26, square in cross section, of a rod 27, may be passed. The rod 27 is held against accidental removal by a key 28 passing through the projection 26. The rod 27 is provided at its outer end with a recess 28, square in cross section, in which is adapted to project the end of a rod 29, square in cross section, a key 30 being provided to secure said rod to said shaft.

Slipped on the rod 29, and adapted to project beyond the outer end thereof, is a tubular member 31, square in cross section. In general, the parts 27, 29 and 31 correspond to the parts 15, 18 and 21 of the device of the preceding figures. The operation of this modified form of construction is exactly the same as the preferred form, previously described.

What I claim to be new is:

1. An attachment for an automobile driving wheel and constituting a driving device for a pipe-threading mechanism, said attachment comprising a member having a substantially annular series of apertures, fastening means passing through said apertures and engageable with the spokes of said driving wheel, a shaft adapted to be secured centrally to said member and provided at one end with a recess, square in cross section, a rod, square in cross section, projecting into said recess, and a tubular member, square in cross section, slipped on said rod and projecting beyond the end thereof.

2. An attachment for an automobile driving wheel and constituting a driving device for a pipe threading mechanism, said attachment comprising a member having a substantially annular series of apertures, fastening means passing through said apertures and engageable with the spokes of said driving wheel, and comprising hook-carrying bolts, a shaft adapted to be secured centrally to said member and provided at one end with a recess, square in cross section, a rod, square in cross section, projecting into said recess, and a tubular member, square in cross section, slipped on said rod and projecting beyond the end thereof.

3. An attachment for an automobile driving wheel and constituting a driving device for a pipe threading mechanism, said attachment comprising a hub protector member of annular cross section and cored internally to provide a recess in which the hub and hub cap of the wheel are disposable, and carrying a lateral marginal flange, said flange being provided with a substantially annular series of apertures, fastening means adapted to pass through said apertures to secure said hub protector member to the spokes of said wheel, a shaft adapted to be secured to the end of said hub protector member, a rod adapted to be secured to the end of said shaft, and a tubular member longitudinally slidable on said rod, being held against independent rotation thereon, said tubular member projecting beyond the end of said rod to provide an end recess in which a pipe-threading device may be engaged.

In testimony whereof I hereunto affix my signature.

OTTO O. ADKINS.